May 16, 1967  W. C. BELK  3,319,683
METHOD OF SECTIONIZING CITRUS FRUIT
Original Filed April 30, 1962  3 Sheets-Sheet 1
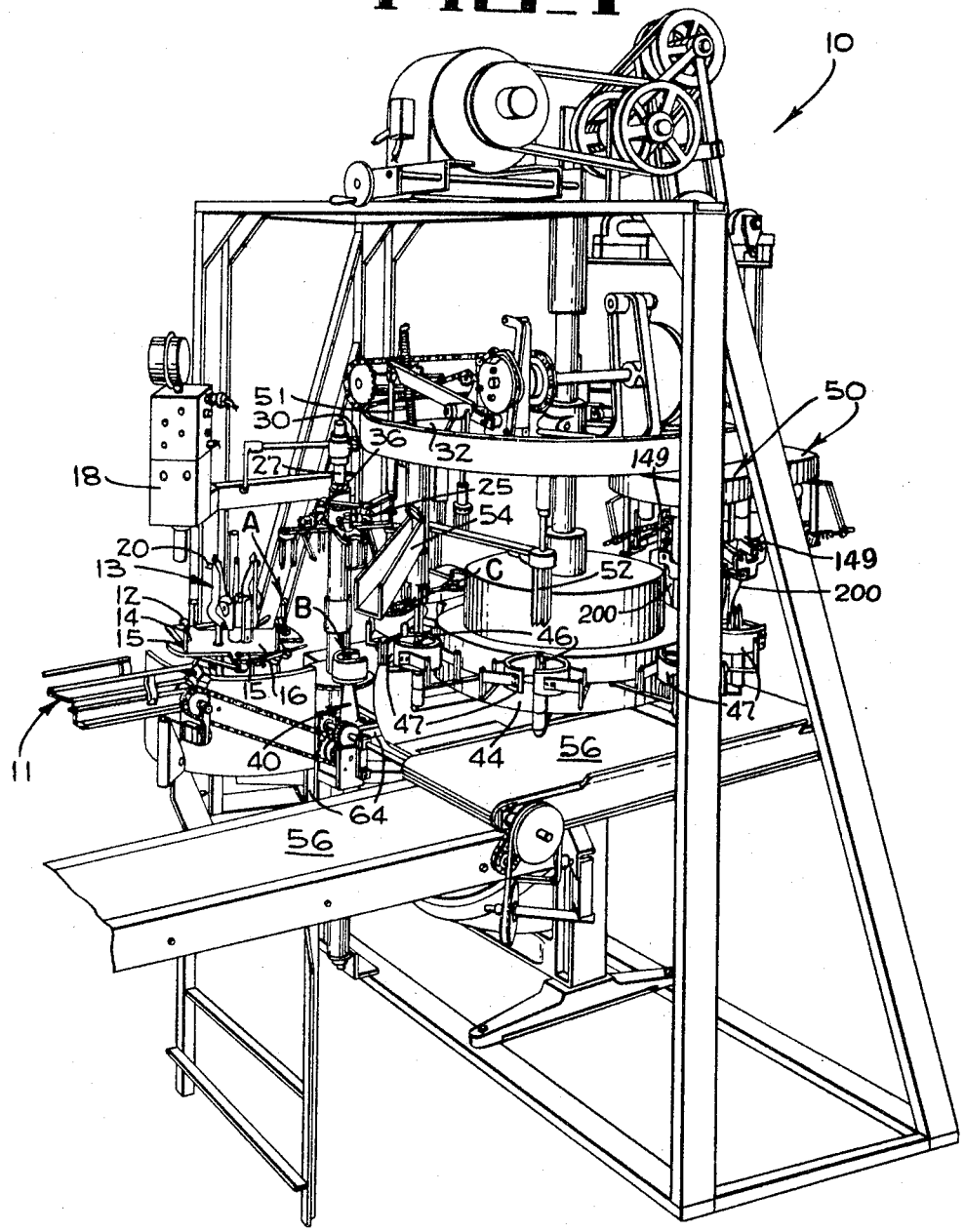
INVENTOR
WILBER C. BELK
BY Francis W. Anderson
ATTORNEY

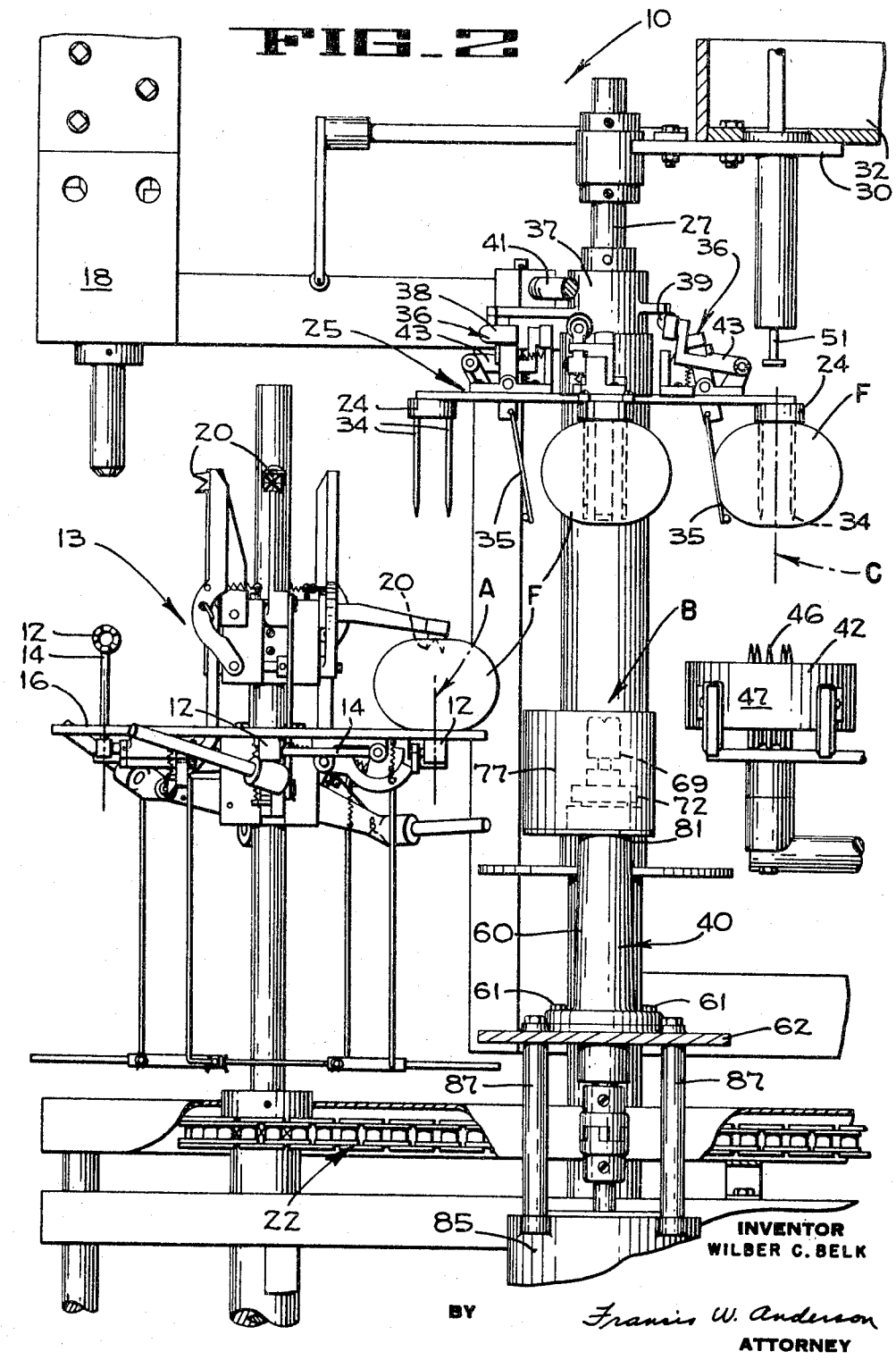

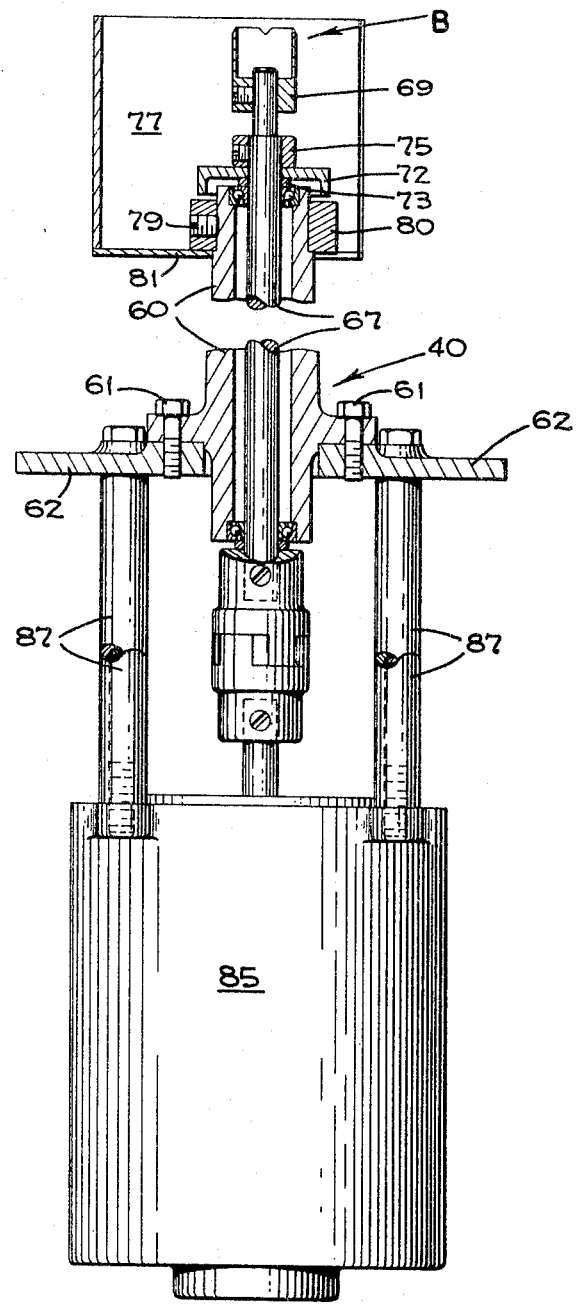
FIG_3

3,319,683
METHOD OF SECTIONIZING CITRUS FRUIT
Wilber C. Belk, Lakeland, Fla., assignor to FMC Corporation, San Jose, Calif., a corporation of Delaware
Original application Apr. 30, 1962, Ser. No. 190,898, now Patent No. 3,205,926, dated Sept. 14, 1965. Divided and this application Dec. 11, 1964, Ser. No. 425,101
3 Claims. (Cl. 146—236)

This application is a division of application, Ser. No. 190,898, filed Apr. 30, 1962, now Patent No. 3,205,926.

This invention pertains to a method of sectionizing citrus fruit.

In certain grapefruit sectionizing machines the grapefruit to be sectionized is held in fixed position while sectionizing blades are moved downwardly through the fruit between each radial membrane and the adjacent meat segments. The blades are to designed and manipulated that substantially all of the meat segments are separated from the membranes which remain attached to the core. However, in addition to the radial membranes, the core is attached to the meat segments at the stem end of the fruit by string-like members and other connectors which, in some cases, prevent the meat segments from falling away from the core even if the segments have been separated from the radial membranes.

It is, therefore, an object of the present invention to provide an improved method for sectionizing whole peeled citrus fruit.

Another object is to provide an improved method of sectionizing citrus fruit.

Other and further features, objects and advantages of the present invention will become apparent from the following description taken in connection with the accompanying drawings in which:

FIGURE 1 is a perspective of a citrus fruit sectionizing machine embodying the stem end cutter of the present invention.

FIGURE 2 is an enlarged fragmentary elevation of the feed and transfer turrets of the machine of FIGURE 1.

FIGURE 3 is an enlarged fragmentary elevation of a portion of FIG. 2, particularly showing the stem end cutter of the present invention and its drive mechanism.

In FIGURES 1 and 2 one embodiment of the stem end cutter of the present invention is shown incorporated in a citrus fruit sectionizing machine 10 which is disclosed in my pending application Ser. No. 823,107, now Patent No. 3,105,531. Since the entire machine 10 is completely disclosed in said patent, only those parts of the machine that have been modified to accommodate the stem end cutter of the present invention will be described in detail herein, it being understood that reference may be had to said patent for a complete description of the construction and operation of all mechanisms of the machine that are not described in detail herein.

In general, the machine 10 upon which the method may be carried out is more fully disclosed in the above-mentioned Patent No. 3,205,926 and comprises a conveyor 11 on which grapefruit, which have been peeled and treated with lye, are delivered to an operator who stands adjacent a feed turret 13. The operator removes each grapefruit from the conveyor 11, places the stem end of the fruit against a positioning ring 12 of a lever 14, and swings the lever down into a recess 15 (FIG. 1) in a base plate 16 of the feed turret. With the stem end held against shifting by the ring 13, the fruit is pivoted about the stem end to position the blossom end in alignment with a beam of light projected downwardly from a projector 18. When the beam has been directed onto the blossom end of the fruit, a clamp 20 is swung downwardly to lock the fruit on the plate 16 of the feed turret.

The feed turret 13 is arranged to be intermittently indexed in a clockwise direction (FIG. 1) in 90 degree angular increments by a drive mechanism indicated generally by reference numeral 22 (FIG. 2). When the feed turret has been indexed twice, the fruit F (FIG. 2) comes to rest at a transfer station A immediately below a clamp 24 carried on a transfer turret 25 which is arranged to be indexed in a counterclockwise direction (FIG. 1) about the axis of a shaft 27. Besides being rotatable, the transfer turret 25 is mounted for vertical movement due to the fact that the upper end of the turret shaft 27 is connected by a bracket 30 to a vertically movable tool carrier 32 which carries various fruit processing tools of the machine 10.

When a fruit is held at station A of the feed turret 13 and the transfer turret 25 is lowered, a prong unit 34 of the clamp 24 penetrates into the fruit and a spring arm 35 is moved into engagement with the side of the fruit to lock the fruit on the prong unit. A camming and latching mechanism 36 is arranged to control the movement of each spring arm into and out of engagement with the fruit on the prong unit 34. This camming and latching mechanism 36 is fully described in the application of Hans W. Grotewold, Ser. No. 46,662, now Patent No. 3,132,750, which is assigned to the assignee of the present invention. In general this mechanism 36 comprises a hub 37 which is rotatably mounted on the transfer turret shaft 27 and carries two cams 38 and 39. A link 41 is arranged to be periodically actuated in timed relation to the movement of the transfer turret to oscillate said cams when the turret is in its lowered position. Cam 38 engages the actuating linkage of a spring arm 35 at station A to swing it into engagement with the fruit and to cause a latch mechanism 43 to engage that linkage. At the same time, cam 39 engages the latch mechanism 43 at station C to unlatch the spring arm 35 at that station and permit the arm to swing away from the fruit.

When the spring arm 35 at station A has moved into clamping engagement with the fruit the clamp 20 of the feed turret is released and the transfer turret is raised, lifting the fruit away from the base plate 16. When the transfer turret is next indexed through a 90 degree angular movement, the fruit is positioned at station B (FIG. 2) above the stem end cutter 40 of the present invention which will be described in detail hereinafter. In general, the cutter 40 is a continuously rotating cylindrical cutter that has an upwardly directed circular cutting edge. Accordingly, when the transfer turret is next lowered, the cutter 40 cuts a circular cut in the lower stem end of the fruit to sever all connections between the meat segments of the fruit and the core at the stem end.

Next, the transfer turret 25 is raised and then indexed through another 90 degree increment to position the fruit at station C above a fruit carrier 42 that is mounted on a main turret 44 (FIG. 1) of the machine. When the transfer turret is lowered, the fruit is impaled on a prong-type spindle 46 disposed centrally in a fruit clamping mechanism 47. At this point the spring arm 35, which is bearing against the side of the fruit, is released by the cam 39 and a hold-down member 51, that is carried by the tool carrier 32, is moved down into engagement with the top of the fruit and holds it on the spindle 46 while the transfer turret is raised, thus completing the transfer of the fruit from the transfer turret 25 to the main turret 44.

The main turret 44 is arranged to be rotated clockwise (FIG. 1) to successively position each fruit carried in a fruit carrier 42 below a series of processing tools including four heads 50 (two only being shown) which carry sectionizing blades, a stripper mechanism 52, and a core removal unit 54. Each tool is arranged to engage the fruit and perform a particular operation thereon as the tool carrier 32 is lowered. In particular, it should be noted that each head 50 carries a plurality of sectionizing blades which penetrate into the upper end of the fruit and work their way downwardly between each meat segment of the fruit and its enclosing membranes to separate the segments from the membranes. After the fruit has been subjected to the action of the stripper 52, the segments of the fruit have been effectively separated from the core, and the segments drop onto a discharge conveyor 56 which carries them to a collection station.

As best seen in FIGS. 2 and 3, the stem and cutter 40 of the present invention comprises a tubular support member 60 which is secured by capscrews 61 to a fixed plate 62 that is connected to the support structure 64 of the machine by a suitable bracket. A drive shaft 67 is journalled for rotation in the tubular member 60 and carries a cylindrical cutter 69 at its upper end. The cutter, which is setscrewed to shaft 67 has a sharpened, generally circular, upwardly projecting, notched cutting edge. A deflector 72 is locked on shaft 67 between a washer 73 and a set collar 75. A shield 77, which is formed as part of a cylinder, is secured around the cutter on the upper end of the tubular support member 60 by means of a setscrew 79 that is threaded through a collar 80 welded to a base plate 81 of the shield, said plate having a drain aperture therein.

The cutter is driven by an electric motor 85 which may be energized from any suitable source of electric power and is supported from the fixed plate 62 by four posts 87. During operation of the machine the motor 85 is continuously in operation to continuously rotate the cutter 40.

As previously mentioned, when the fruit is carried downwardly at station B, the fruit is moved into engagement with the cutter 40. This cutter should be about 1 inch in diameter and should be positioned so that it penetrates into the fruit about ½ inch when the transfer turret is at the bottom of its downward movement.

Heretofore the meat segments of the fruit have been separated from the core, either by the manual manipulation of a sectionizing blade or by a machine but, in each case, cuts have been made into the fruit from one end of the fruit only. Accordingly, a violet shaking or stripping action at the end of the sectionizing operation was relied upon to break loose any connections between the other end of the fruit and the core. The present invention provides a new, improved method of sectionizing which comprises the steps of making a circular cut in one end of the fruit around the core to cut the connections of the meat segments to the core at that end, and then entering the opposite end of the fruit and progressively separating each meat segment from its adjacent membrane. As each segment is separated from its two enclosing membranes, it will drop away from the core since all connections to the core have been broken.

Further, the stem end cutter and the associated mechanisms of the machine, including the sectionizing heads 50 provide an effective mechanism for carrying out this method which, of course, could be carried out by the manual manipulation of a suitable cutter and a sectionizing blade.

Having thus described my invention what I claim as new and desire to protect by Letters Patent is:

1. In a method of sectionizing a whole peeled citrus fruit the steps of making a circular cut in the stem end of the fruit in an area encircling the core to sever connections at the stem end between the meat segments of the fruit and the core, and engaging each meat segment at the blossom end of the fruit and forcing the segment away from the adjacent membranes, the separation between membrane and the segment taking place progressively from the blossom end to the stem end of the fruit.

2. In a method of sectionizing a whole peeled citrus fruit, the steps of making a circular cut approximately one-half inch deep and approximately one inch in diameter in one end of the fruit in an area encircling the core to sever connections at that end between the core and the meat segments of the fruit, and engaging each meat segment at the opposite end of the fruit and forcing the segment away from the enclosing membrane, the separation between the membrane and the segment taking place progressively from said opposite end to said one end.

3. In a method of sectionizing peeled citrus fruit, the steps of making a cut in one end of the fruit encircling the core and only partially through the fruit to sever connections at that end between the core and the meat segments of the fruit, and engaging each meat segment of the fruit at the opposite end of the fruit and separating the meat segment from the membrane, said separation taking place progressively from said opposite end to said one end.

References Cited by the Examiner

UNITED STATES PATENTS 2,549,333   4/1951   Polk et al. _____ 146—236

W. G. ABERCROMBIE, *Assistant Examiner.*

WILLIAM W. DYER, JR., *Primary Examiner.*